Patented Mar. 3, 1953

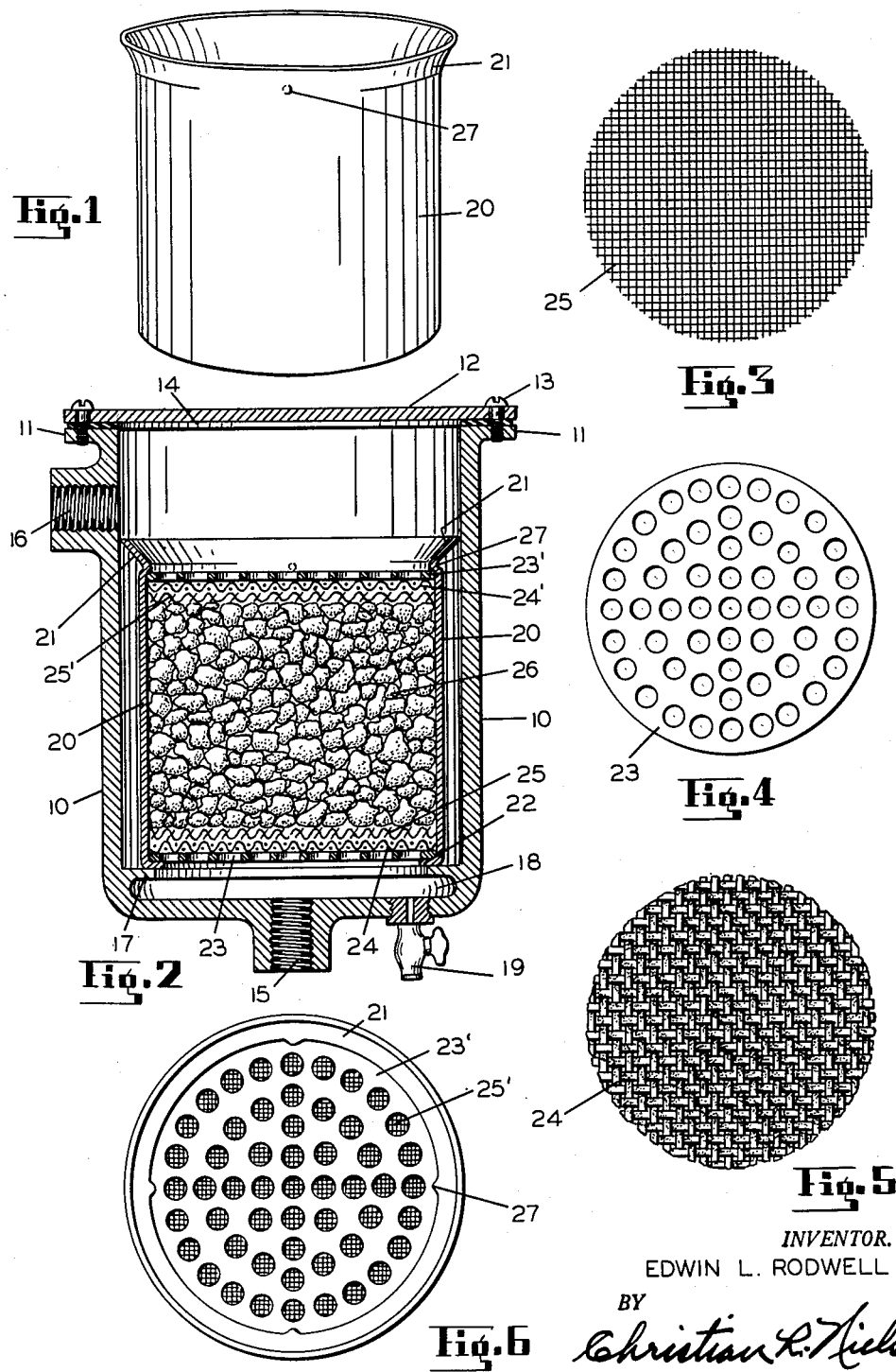

2,630,227

UNITED STATES PATENT OFFICE 2,630,227

FILTER

Edwin L. Rodwell, Omaha, Nebr.

Application April 5, 1951, Serial No. 219,361

4 Claims. (Cl. 210—131)

My invention relates to filters, and more particularly to filters to be used with liquid or the like.

An object of my invention is to provide a filter construction incorporating a self-contained cartridge element that may be readily replaced.

Another object of my invention is to provide a filter for liquids that comprises an enclosure equipped with an inlet at its lower end, and an outlet at its upper end, and a removable, replaceable cartridge disposed between the inlet and outlet.

Still another object of my invention is to provide a filter cartridge forming a part of a fluid filtering unit wherein the cartridge is a sealed, self-contained unit arranged for suspension within the enclosure forming the filter body.

It is manifest to anyone familiar with the construction of filters for fluid or liquid, that the fluid passing through the unit is filtered through the filtering material which is disposed in the form of a plurality of laminations within the filter unit.

The prime object of my invention is to provide a filter in which the filtering material is enclosed within a cartridge adaptable to be inserted into a filter housing in a manner whereby it can be easily removed or replaced.

The device as described, claimed and illustrated herein is simple in construction and easily manipulated.

Other and further objects of my invention will become more apparent as the description proceeds, when taken into conjunction with the drawing in which:

Figure 1 is a cylindrical container forming the body of a filter cartridge.

Figure 2 is a longitudinal cross-sectional view of an assembled filtering unit, with the assembled filter cartridge inserted therein.

Figure 3 is a plan view of a circular portion of a metallic screen, forming a part of the filtering cartridge assembly.

Figure 4 is a plan view of a circular perforated plate also forming a part of the filtering cartridge assembly.

Figure 5 is a circular portion of fabric, and

Figure 6 is a top view of the assembled cartridge unit.

Similar characters of reference indicate corresponding parts throughout the several views, and referring now to the same, the character 10 shows a cylindrical housing or enclosure forming a filter body having an outwardly extending flange 11 at its upper open end. There is a cover plate 12 shown attached to the flange 11 by means of the screw 13, and a gasket shown as 14 seals the contact of the plate 12 with the upper face of the flange 11.

The enclosure 10 is shown equipped with a threaded port 15 at the bottom, which acts as a means for attaching a tubular inlet (not shown) and a threaded port 16, to accommodate the tubular outlet (not shown). Near the bottom of the inner face of the cylindrical enclosure 10 is shown an inwardly extending ledge 17, which separates the enclosure and provide a sump portion 18, which may be constructed in the conventional manner, and which may be provided with a drain cock shown as 19 if desired.

There is a cartridge type of filter assembly shown disposed within the cylindrical enclosure 10. This cartridge is a separate and complete unit arranged for being easily inserted and removed from the body, and consists of a cylindrical shell 20 open at both its upper and lower ends, and has an angularly disposed flange 21 flared outwardly around its upper peripheral edge, and an inwardly disposed flange 22 projecting inward at its lower peripheral edge. When the shell 20 is slidably inserted into the enclosure 10, the upper flange 21 contacts the inner face of the body 10, and the lower flange 22 will rest on the ledge 17 which is shown constructed as an integral part of the wall of the body 10.

The cartridge unit when assembled, is comprised of a perforated plate 23 such as is shown in Figure 4 of a circular diameter and contour resting on the upper face of the inwardly disposed flange 22. A circular piece of fabric such as burlap or the like, shown as 24 in Figure 5, rests on the upper face of the perforated plate 23, and a piece of wire-mesh screen 25 as shown in Figure 3, rests on top of the burlap sheet 24. All three of these units, 23, 24 and 25 are thus placed onto and are supported by the flange 22 and act as a support for a quantity of filtering materials such as anthracite coal or the like which is shown as 26 in Figure 2.

Above the filtering material 26, I again place a wire screen 25' supporting a burlap sheet 24', and held in position by another perforated metal plate 23' as shown in Figure 2, and the side walls of the shell 20 are slightly indented inwardly as shown at 27 to prevent the plate 23' from being disengaged, thereby providing a solidly packed, self-contained cartridge unit that may be slidably inserted into the body 10 when the cover 12 is removed. The cartridge assembly is supported at its bottom by the ledge 17, and at its top by the outward edge of the angularly flared flange 21. The simplicity of its construction identifies the cartridge unit from the conventional type, and the construction permits ease in its manipulation when replacing the cartridge is necessitated.

In the chosen embodiment of my invention exemplified by the accompanying drawing, there are many features not heretofore disclosed, and although I have shown a specific construction and arrangement of the parts constituting the device, I am fully cognizant of the fact that many changes may be made in the form and configuration of the parts, without affecting their operativeness, and without departing from the spirit of my invention or the scope of the appended claims.

Having thus described my invention, what I claim and desire to secure by Letters Patent of the United States is:

1. A filtering device comprising, a cylindrical enclosure open at its upper end and provided with an inlet and outlet port through its wall, a cover for engagement with the upper open end of said enclosure, a ledge extending inward from the inner face of the wall of said enclosure near its lower end, in combination with a cartridge assembly comprising a cylindrical shell open at its upper and lower ends, an outwardly disposed flange around the outer periphery of the upper end of said shell, an inwardly disposed flange extending around the outer periphery of the lower end of said shell, a perforated circular plate engaging the inwardly disposed flange at its upper face, a circular fabric disc disposed on the top surface of said perforated plate, a circular wire mesh plate disposed on the top surface of said fabric disc, a mass of filtering material disposed on the top surface of said wire mesh plate, another wire mesh plate disposed on the top of said filtering means, another fabric disc on the last mentioned wire mesh plate, a perforated plate disposed on the top of said last mentioned fabric disc, inwardly projecting means on the inner face of said shell immediately above said last mentioned perforated plate for retaining all of said plates, and the filtering material disposed between them in a fixed position within said shell against said lower inwardly extending flange.

2. A filtering device comprising, a cylindrical enclosure open at its upper end, and provided with an inlet and outlet port, a cover for engagement with the upper open end of said enclosure, a ledge extending inward from the inner face of the wall of said enclosure near its lower end, a drain cock extending through the wall of said enclosure at a point below said ledge, in combination with a cartridge assembly comprising, a cylindrical shell open at its upper and lower ends, an outwardly disposed flange on the outer periphery of the upper end of said shell, the edge of said flange slidably contacting the inner face of the side walls of said enclosure when said cartridge is disposed within said enclosure, an inwardly disposed flange extending around the outer periphery of the lower end of said shell, a perforated plate engaging the inwardly disposed flange at its upper face, a fabric disc disposed at the top of the surface of said perforated plate, a wire mesh plate disposed on the top surface of said fabric disc, a mass of filtering material disposed on the top surface of said wire mesh plate, another wire mesh plate disposed on the top of said filtering material and another fabric disc disposed on the last mentioned wire mesh plate, a perforated plate disposed on the top of said last mentioned fabric disc, and inwardly projecting means on the inner surface of said shell immediately above said last mentioned perforated plate for retaining all of said plates and the filtering material disposed between them, in a fixed position within said shell against said lower inwardly extending flange.

3. A filtering device comprising, a cylindrical enclosure open at its upper end, said enclosure provided with an inlet and outlet port, a cover for engaging the upper open end of said enclosure, a ledge extending inward from the inner face of said wall of said enclosure, a drain cock extending through the wall of said enclosure at a point below said ledge, in combination with a cartridge assembly comprising, a cylindrical shell open at its upper and lower ends, an outwardly disposed angular flange around the outer periphery of the upper end of said shell, the outer edge of said flange slidably contacting the inner face of the side walls of said enclosure when said cartridge is disposed therein, an inwardly disposed flange extending around the outer periphery of the lower end of said shell, a perforated plate engaging the inner disposed flange at its upper face, a fabric disc disposed on the top surface of said perforated plate, a wire mesh plate disposed on the top surface of said fabric disc, a mass of filtering material disposed on the top surface of said wire mesh plate, another wire mesh plate disposed on the top of said filtering material, another fabric disc disposed on the last mentioned wire mesh plate, a perforated plate disposed on the top of said last mentioned fabric disc and an inwardly projecting means on the inner face of said shell immediately above said last mentioned perforated plate for retaining all of said plates and the filtering material disposed between them, in a fixed position within said shell and against the lower inwardly extending flange.

4. A filtering device comprising, a cylindrical enclosure open at its upper end, a cover for engagement with the upper open end of said enclosure, a ledge extending inwardly from the inner face of the wall of said enclosure near the bottom thereof, a drain cock extending through the bottom of said enclosure, in combination with a cartridge assembly comprising, a cylindrical shell open at its upper and lower ends, an outwardly disposed angular flange around the outer periphery at the upper end of said shell, said flange disposed for slidably contacting the inner face of the wall of said enclosure, an inwardly depending flange extending around the outer periphery at the lower end of said shell, a perforated plate, a fabric disc, and a wire mesh plate forming a lower assembly extending across the open end of said cartridge shell and resting on said inwardly disposed flange, a mass of filtering material disposed on the top of said assembly, a similar upper plate assembly consisting of a perforated plate, a fabric disc and a wire mesh plate, resting on the top of said filtering material, means for retaining said last mentioned plate assembly within said cartridge shell thereby retaining said filtering material between said upper and lower assembly of plates.

EDWIN L. RODWELL.

REFERENCES CITED

The following references are of record in the file of this patent:

UNITED STATES PATENTS

| Number | Name | Date |
|---|---|---|
| 476,671 | Moeller | June 7, 1892 |
| 773,946 | Langill | Nov. 1, 1904 |
| 788,359 | Kasper | Apr. 25, 1905 |
| 1,162,455 | Collins | Nov. 30, 1915 |
| 2,098,102 | McLean | Nov. 2, 1937 |